UNITED STATES PATENT OFFICE.

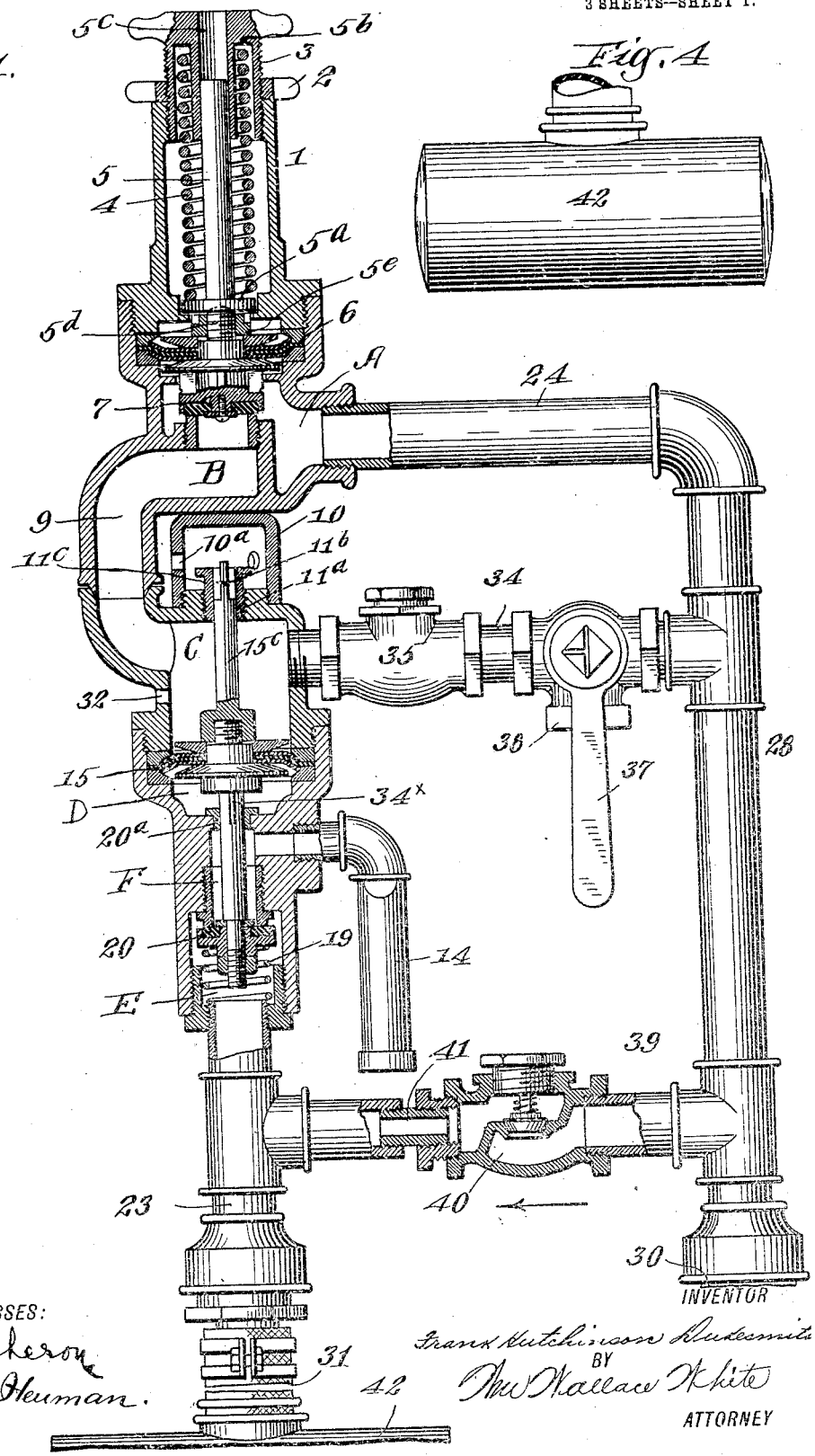

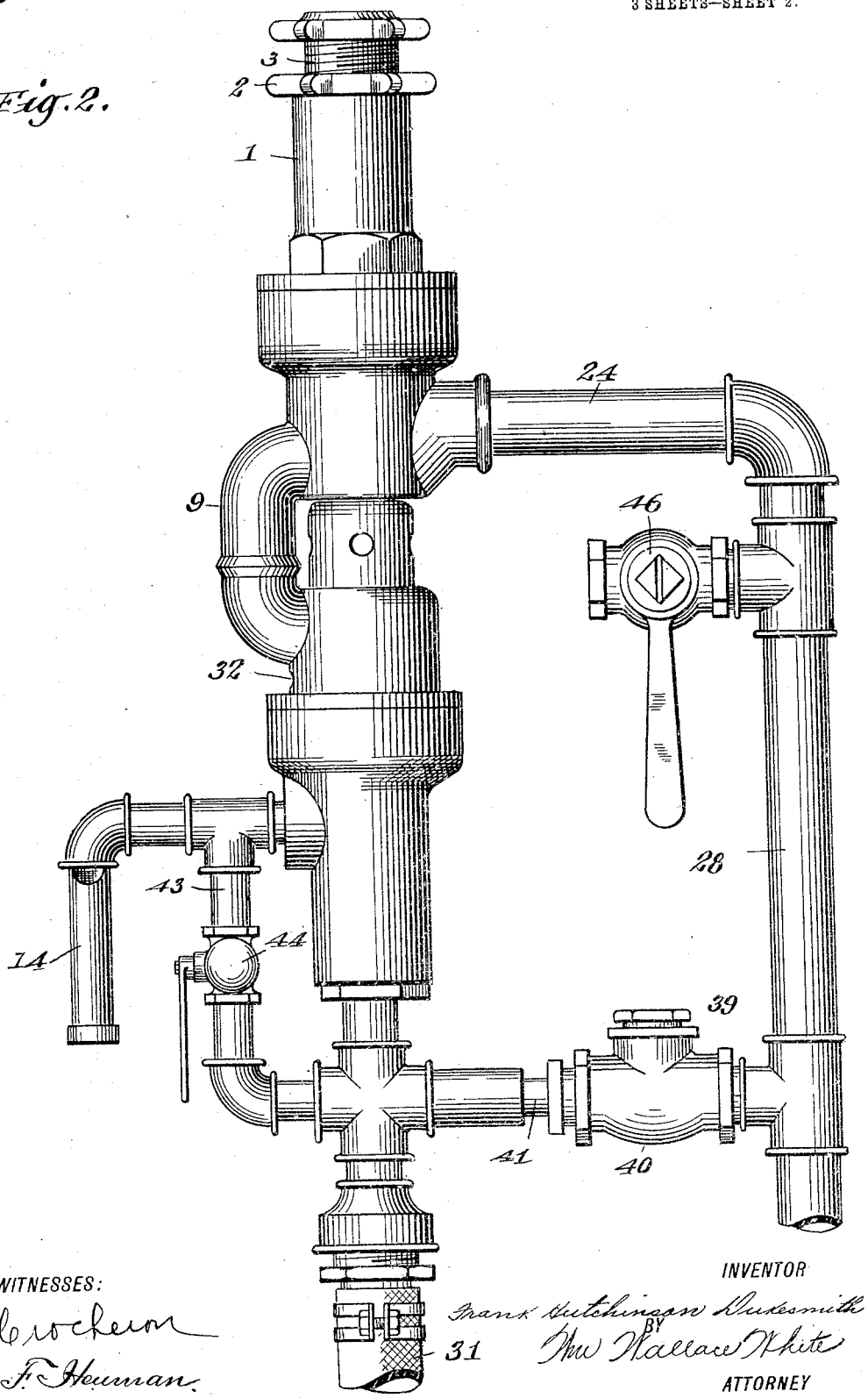

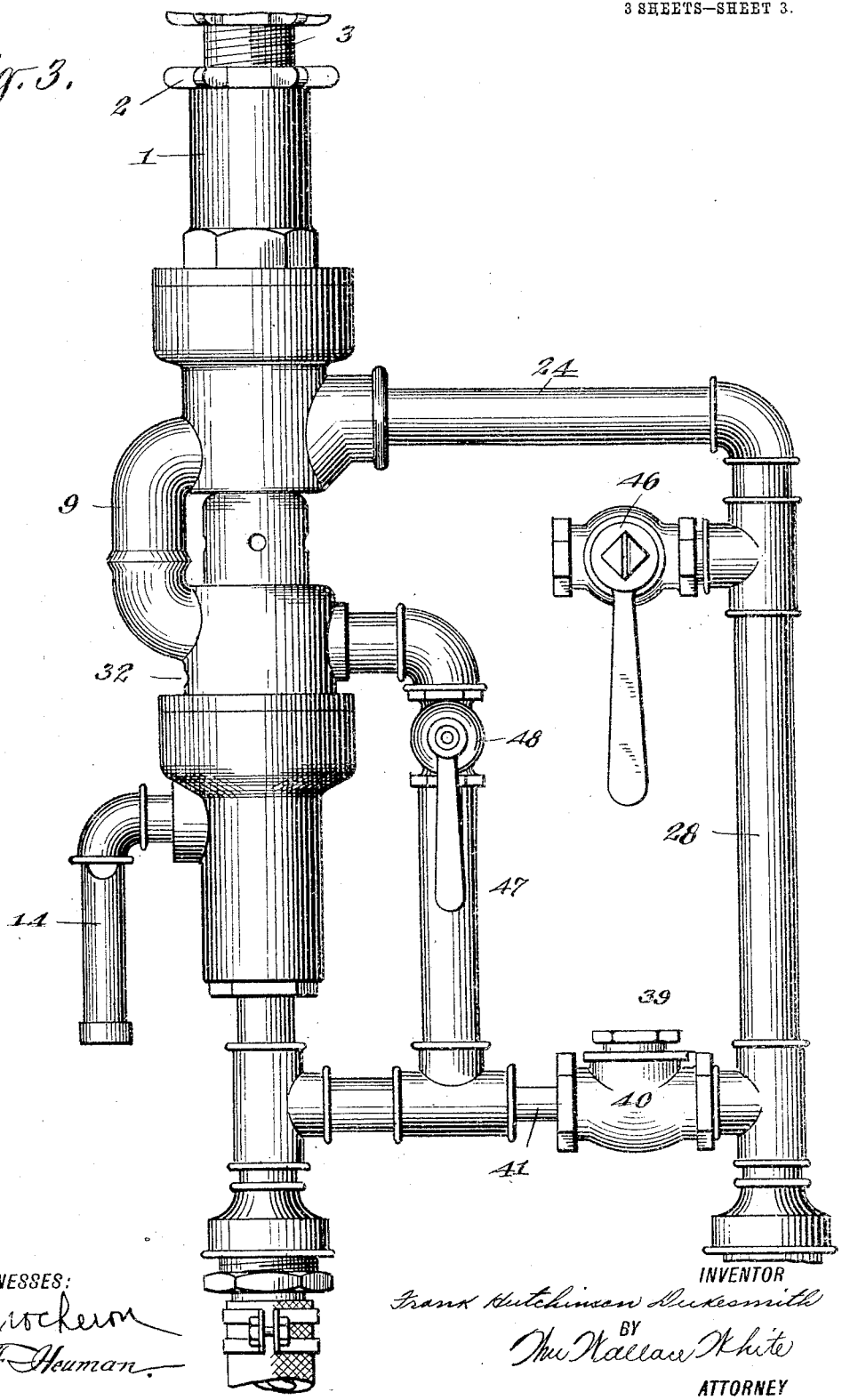

FRANK HUTCHINSON DUKESMITH, OF MEADVILLE, PENNSYLVANIA, ASSIGNOR TO THE GENERAL RAILWAY EQUIPMENT COMPANY, A CORPORATION OF MAINE.

APPARATUS FOR TESTING AIR-BRAKES.

959,124.  Specification of Letters Patent.  Patented May 24, 1910.

Application filed July 30, 1909. Serial No. 510,431.

*To all whom it may concern:*

Be it known that I, FRANK HUTCHINSON DUKESMITH, a citizen of the United States, residing at Eiler Block, Meadville, Pennsylvania, have invented new and useful Improvements in Apparatus for Testing Air-Brakes, of which the following is a specification.

This invention relates to an improvement in apparatus for testing air brakes when prepared for service through the agency of valve mechanism attached to the train pipe.

One of the objects of the invention is to provide means whereby an engineer in the cab of a locomotive may determine if the air brake conduit or train pipe is properly coupled up, and whether all the angle cocks are open.

Another object is to provide means whereby a brakeman at a point distant from the locomotive may apply the brakes or operate a signal at the distant point, for the purpose of signaling the engineer, or to indicate that the train is about to back up.

The invention, while capable of various uses is especially suitable for use with freight trains, or other trains which are not provided with a whistle pipe extending throughout the length thereof.

Other objects will in part be obvious, and in part pointed out hereinafter.

Certain of the broad features of the invention are not claimed herein, as they are shown and claimed in applicant's copending applications, Serial Number 495615, filed May 13th, 1909, and Serial Numbers 506758 and 506759, filed July 9th, 1909.

The invention accordingly consists in the features of construction, combinations of elements, and arrangements of parts which will be exemplified in the construction hereinafter set forth, and the scope of the application of which will be indicated in the following claims.

In the accompanying drawings there are shown several illustrative embodiments of the invention, in which similar reference characters refer to similar parts in the several figures.

Figure 1 shows the invention as applied to a freight train, parts being shown in section. Fig. 2 is an elevational view showing a modified form of apparatus. Fig. 3 is a similar view showing a still further modification of the apparatus. Fig. 4 is a detail view of the supplemental reservoir.

Referring to Fig. 1 there is shown a regulating valve comprising a cylindrical portion 1 with which a cylindrical member 3 is in threaded engagement, and with which member a nut 2 engages. Within the portion 1 is positioned a spindle 5, normally pressed downward by means of a coil spring 4, one end of which rests against a shoulder $5^a$, and the other end of which is seated against a shoulder $5^b$, formed in the cylindrical member 3. By varying the position of member 3 with respect to the portion 1, the tension of the spring 4 may be varied, and the member 2 acts as a locknut to retain the parts in position. An aperture $5^c$ is preferably provided in the member 3 for the purpose of guiding the upper end of the spindle 5. The lower portion of the spindle 5 rests upon the valve spindle $5^d$, which is preferably threaded, and is attached to the diaphragm 6, in any suitable manner, as by means of a nut $5^e$. The valve spindle $5^d$ carries at its lower end a valve 7 which normally covers a port between chambers A and B, the former of which communicates with the train pipe 28, as hereinafter described, and the latter of which forms a portion of the signal conduit. A conduit or passage 9 connects chamber B with the chamber C, in the lower portion of which is positioned a diaphragm 15 to which a spindle $15^c$ is operatively secured in any suitable manner, as, for example, by screwing the two portions of the spindle to the diaphragm in the manner shown in the drawing. At its upper end the spindle passes through an exhaust port $11^a$, and its extreme upper end is cut away as shown at $11^b$, thereby forming a guide for the spindle and forming an exhaust valve. A bushing $11^c$ is preferably provided within which the upper end of the spindle $15^c$ may slide, and which serves to guide the spindle in its movement. The chamber C is preferably provided with a cap piece 10 containing perforations $10^a$. It will be understood from the above description that as the diaphragm 15 is depressed by pressure in the chamber C, the spindle $15^c$ will descend, and after it has traveled a suitable distance the lower portion of the reduced portion 11$^b$ will be drawn below the bushing thus permitting the escape of pressure from the chamber C and permitting the diaphragm and spindle to return to their normal positions. To the lower end of the spindle 15$^c$ is secured a valve 20 which normally closes a port between the chamber F and the chamber E, the latter of which is connected through pipe 23 with a supplemental reservoir 42 in any suitable manner, as for example, by means of an ordinary hose coupling 31. The chamber F is closed at its upper end by a member 20$^a$, so that when the valve 20 uncovers its port, the pressure from the pipe 23 will not immediately affect the diaphragm 15. A suitable spring 19 is preferably provided for assisting in closing the valve 20. The closing of the valve 20 and the exhaust valve 11$^b$ is further aided by fluid passing from chamber F through a groove 34$^x$ formed in the spindle 15$^c$, which groove is normally in its inoperative position, but becomes operative when the spindle has been depressed a suitable distance by means of the pressure in chamber C acting upon the diaphragm 15. A whistle 14 is in communication with chamber F as indicated in the drawing. To supply the foregoing parts with pressure the chamber A is connected by a suitable pipe 24 to the pipe 28 which is adapted to be united to a standard air hose connection 30, coupled in the usual way to the brake pipe of the train. A cross connection 39 leads from the pipe 28 to the pipe 23, and in this connection is located a check valve 40 operating against pressure in the train pipe 28, so that fluid may flow from the pipe 28 across to the pipe 23 when the pressure in the former pipe exceeds that in the latter pipe, but will prevent any flow in the opposite direction when the brakes are applied, or in case the train pipe should break in two. In order that the flow of pressure through this cross connection may be regulated, a reducing nipple 41 having a small bore is inserted. It will be apparent from these connections that when normal pressure exists in the train pipe 28, such pressure will be communicated through the cross connection 39, to the supplemental reservoir 42, thus providing that this reservoir will contain compressed air under substantially the same pressure as that in the train pipe.

The operation of the parts thus far described is as follows: When the pressure in the train pipe is normal, the valve 7 closes the port between the chambers A and B, it being understood that the tension of the spring 4 is so adjusted that it will only allow the valve 7 to be unseated when the pressure in the train pipe exceeds the normal pressure. Under these conditions no signal will be sounded. If the engineer desires to test the train pipe system, he, from the cab, admits to the pipe 28 an excess of pressure, sufficient to raise the diaphragm 6, thereby lifting the valve 7 from its seat, and permitting pressure from the train pipe to pass into the signal conduit consisting of chambers B and C and conduit 9. When the pressure reaches the chamber C it depresses the diaphragm 15, thus opening the valve 20, and permitting pressure to pass from the supplemental reservoir 42 through the pipe 23, into the test whistle 14. In this way the test whistle indicates to the brakeman at the rear of the train, as well as to the engineer in the cab, that the train pipe couplings and the angle cocks are all in suitable order. In order that the whistle may not be prolonged, the exhaust valve 11$^b$ will open shortly after the valve 20 is opened, thus permitting the escape of pressure from chamber C to the outer air. As the valve 20 operates in advance of the valve 11$^b$, the test signal will begin to operate before the opening of the exhaust valve. After the exhaust valve has moved into its closed position, any residual pressure which may remain in the signal conduit may escape through a suitable vent 32 of preferably a small area which is provided in the wall of the chamber C. This vent furthermore provides an outlet for any air which might leak past the valve 7, or to carry off any slight excess pressure which may get into the train pipe through the carelessness of the engineer. In order to prevent accumulation of pressure in the chamber D, which is between the diaphragm 15 and the chamber F, the diameter of the spindle 15$^c$ is preferably slightly less than the diameter of the aperture in the chamber 20$^a$ through which it passes, thus permitting the pressure to pass from the chamber D to the chamber F, from which it escapes through the whistle. In order to enable a brakeman to operate the signal, there is provided in this embodiment of the invention a bypass 34, containing a check valve 35, adapted to permit the passage of pressure from the train pipe 28 to the signal conduit, and also a three-way valve 37 which may be operated to permit pressure to pass from the pipe 28 into the chamber C, or to permit the pressure to escape through the exhaust outlet 38. This check serves to prevent pressure from chamber C escaping to the atmosphere through the three-way valve 37 when the engineer is operating the device. It will thus be seen that a brakeman by turning the valve 37 to one of its positions will permit pressure from the pipe 28 to enter the chamber C, thereby operating the diaphragm and the valve 20 in a manner similar to that above described, or by turning the valve to its second alternate position, he may apply the brakes by releasing the pressure within the pipe 28.

The supplemental reservoir is preferably positioned upon the caboose, although, of course, the invention is not limited to this particular location of the reservoir. In instances where the train comprises freight cars which are not fitted with air brakes, and the corresponding train pipe, it will, of course, be impossible to employ a supplemental reservoir carried by the caboose. In such instances it is proposed to place the mechanism upon one of the cars which is provided with air brakes, and connect the pipe 23 with the usual supplemental air brake reservoir of the car immediately in the rear thereof, such reservoir being a well known part of the equipment of every standard automatic air-brake system.

In the modification shown in Fig. 2, the valve mechanism is the same as in Fig. 1, but the bypass 34 between the pipe 28 and the chamber C is omitted. In the modification shown in this figure, there is a bypass 43 from the pipe 23 direct to the whistle 14, and the flow of pressure therethrough is controlled by a suitable two-way valve 44, which may be operated by the brakeman for the purpose of sounding the whistle, by pressure from the supplemental tank 42. In order to enable the brakeman to set the brakes, a suitable two-way cock 46 is associated with the pipe 28, which, when opened, will release the pressure within said pipe, and permit the application of the brake.

In the modification shown in Fig. 3, a bypass 47 is provided between the cross connection 39, and the chamber C, and the flow of pressure therethrough is controlled by an ordinary two way valve 48 which, when opened will permit pressure to pass into chamber C, from the supplemental reservoir, thus depressing the diaphragm 15, and permitting the whistle to be sounded in the manner above described. In this modification also, a two way valve 46 is associated with the pipe 28, for the purpose of enabling the brakeman to set the brake.

In each instance, it will, of course, be understood that when the whistle is sounded, the pressure within the tank will fall, and there will be a flow of fluid through the cross connection 39, until the pressure in the tank 42 is again substantially the same as the pressure in the train pipe.

By means of this device it will be seen that the brakeman may sound the whistle to notify the engineer in the locomotive to make a test, in order to determine if the train pipe connections are complete, or by having a prearranged code of signals, he may transmit any desired information to the engineer.

Having described this invention in connection with the illustrative embodiments thereof, to the details of which disclosure, the invention is, of course, not to be limited, what is claimed as new, and what is desired to be secured by Letters Patent is set forth in the appended claims:

1. In combination with a train, a train pipe extending between the engineer's cab and a distant point of the train, fluid operated signaling means at said distant point, a valve to control the operation of said signaling means, a second valve responsive to an increase in pressure in said train pipe, and interposed between said train pipe and said first valve, for controlling the operation of the latter, and a manually operated valve for controlling the operation of said first mentioned valve.

2. In combination with a train, a train pipe extending between the engineer's cab and a distant point of the train, fluid operated signaling means at said distant point, a valve to control the operation of said signaling means, a second valve responsive to an increase in pressure in said train pipe, and interposed between said train pipe and said first valve, for controlling the operation of the latter, and a manually operated valve interposed between said train pipe and said first mentioned valve for controlling the operation of the latter.

3. In combination with a train, a train pipe extending between the engineer's cab and a distant point of the train, fluid operated signaling means at said distant point, a supplemental reservoir at said distant point for containing fluid under pressure operatively associated with said signaling means, and means responsive to a variation in pressure in the train pipe for controlling the flow of fluid from said reservoir to said signaling means for operating the latter.

4. In combination with a train, a train pipe extending between the engineer's cab and a distant point of the train, fluid operated signaling means at said distant point, a supplemental reservoir at said distant point for containing fluid under pressure operatively associated with said signaling means, means responsive to a variation in pressure in the train pipe for controlling the flow of fluid from said reservoir to said signaling means for operating the latter, and means for maintaining the pressure in said reservoir substantially uniform.

5. In combination with a train, a train pipe extending between the engineer's cab and a distant point of the train, fluid operated signaling means at said distant point, a supplemental reservoir at said distant point containing fluid under pressure operatively associated with said signaling means, means responsive to a variation in pressure in the train pipe for controlling the flow of fluid from said reservoir to said signaling means for operating the latter, and automatically operated means for maintaining the pressure in said reservoir substantially uniform.

6. In combination with a train, a train pipe extending between the engineer's cab and a distant point of the train, fluid operated signaling means at said distant point, a supplemental reservoir at said distant point containing fluid under pressure operatively associated with said signaling means, means responsive to a variation in pressure in the train pipe for controlling the flow of fluid from said reservoir to said signaling means for operating the latter, a conduit extending between said train pipe and said reservoir, and means interposed in said conduit for permitting fluid to flow from said train pipe to said reservoir when the pressure in the latter falls below a predetermined point.

7. In combination with a train, a train pipe extending between the engineer's cab and a distant point of the train, fluid operated signaling means at said distant point, a supplemental reservoir at said distant point for containing fluid under pressure operatively associated with said signaling means, means responsive to a variation in pressure in the train pipe for controlling the flow of fluid from said reservoir to said signaling means for operating the latter, a conduit extending between said train pipe and said reservoir, and a check valve interposed in said conduit and adapted to permit fluid to flow from said train pipe to said reservoir when the pressure in the latter falls below a predetermined point.

8. In combination with a train, a train pipe extending between the engineer's cab and a distant point of the train, fluid operated signaling means at said distant point, a supplemental reservoir at said distant point for containing fluid under pressure operatively associated with said signaling means, means responsive to a variation in pressure in the train pipe for controlling the flow of fluid from said reservoir to said signaling means for operating the latter, a conduit extending between said train pipe and said reservoir, a check valve interposed in said conduit, and adapted to permit fluid to flow from said train pipe to said reservoir when the pressure in the latter falls below a predetermined point, said conduit comprising a portion having a reduced cross section interposed between said check valve and said reservoir.

9. In combination with a train, a train pipe extending between the engineer's cab and a distant point of the train, signaling means at said distant point, pressure operated means for controlling the operation of said signaling means, a signal conduit operatively associated with said pressure operated means, means responsive to an increase of pressure in the train pipe for admitting pressure to said signal conduit for operating said pressure operating means, and manually controlled means for admitting pressure to said signal conduit for operating said pressure operated means.

10. In combination with a train, a train pipe extending between the engineer's cab and a distant point of the train, signaling means at said distant point, pressure operated means for controlling the operation of said signaling means, a signal conduit operatively associated with said pressure operated means, means responsive to an increase of pressure in the train pipe for admitting pressure to said signal conduit for operating said pressure operated means, and manually controlled means interposed between said train pipe and said signal conduit for admitting pressure from the former to the latter for operating said pressure operated means.

11. In combination with a train, a train pipe extending between the engineer's cab and a distant point of the train, signaling means at said distant point, pressure operated means for controlling the operation of said signaling means, a signal conduit operatively associated with said pressure operated means, means responsive to an increase of pressure in the train pipe for admitting pressure to said signal conduit for operating said pressure operated means, a by-pass between said train pipe and said signal conduit, and a valve interposed in said by-pass.

12. In combination with a train, a train pipe extending between the engineer's cab and a distant point of the train, signaling means at said distant point, pressure operated means for controlling the operation of said signaling means, a signal conduit operatively associated with said pressure operated means, means responsive to an increase of pressure in the train pipe for admitting pressure to said signal conduit for operating said pressure operated means, a by-pass between said train pipe and said signal conduit, a check valve interposed in said bypass adapted to permit fluid to flow from said train pipe to said signal conduit, and to prevent the flow of fluid in the opposite direction, and a manually operated valve interposed in said conduit for controlling the flow of fluid therethrough.

In testimony whereof I have signed my name to this specification in the presence of two subscribing witnesses.

FRANK HUTCHINSON DUKESMITH.

Witnesses:
W. P. JONES,
A. L. NORMAN.